July 26, 1932.  H. A. MYERS  1,868,540

UNIVERSAL JOINT

Filed March 24, 1930  2 Sheets-Sheet 1

Inventor
Hubert A. Myers.
By Faust F. Crampton.
Attorney

July 26, 1932.  H. A. MYERS  1,868,540
UNIVERSAL JOINT
Filed March 24, 1930   2 Sheets-Sheet 2

Inventor
Hubert A. Myers
Attorney

Patented July 26, 1932

1,868,540

UNITED STATES PATENT OFFICE

HUBERT A. MYERS, OF TOLEDO, OHIO

UNIVERSAL JOINT

Application filed March 24, 1930. Serial No. 438,280.

My invention has for its object to provide a universal joint which is so constructed that the torque will be transmitted through balls that are free to move and to enable movement between parts of the joint for power transmission from one member to the other, while at the same time maintaining the intersection point of the axis, that is, the center of the joint, in fixed relation, notwithstanding the variations in the speed or the angular relation between the axes of rotation of the members. The invention also provides a rolling contact at the points of interengagement of the parts of the joint. Also, the points of transmission of the power from one member to the other is maintained in a plane that changes angularly as one or the other of the members moves angularly relative to the other of the members and so as to bi-sect, at all times, the angle formed between the axes of rotation of the members. Thus the invention provides a means for transmitting power without loss of power due to binding or due to forcing parts into relation to each other to maintain the same angular rotation in the two members.

The invention also consists in other features and advantages which will appear from the following description and upon examination of the drawings.

The structures containing the invention may partake of different forms that may be varied in their details. To illustrate a practical application of the invention, I have selected a joint embodying the invention, as an example of the various structures and modifications thereof that contain the invention, and shall describe the selected structure hereinafter, it being understood that variations may be made without departing from the spirit of the invention. The particular structure selected, as an example, is shown in the accompanying drawings.

Figure 1:
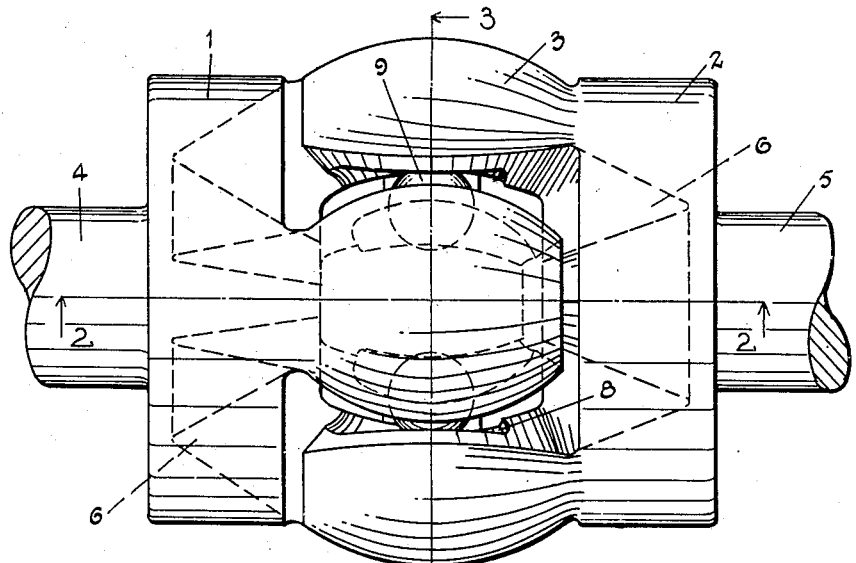
Figure 2:
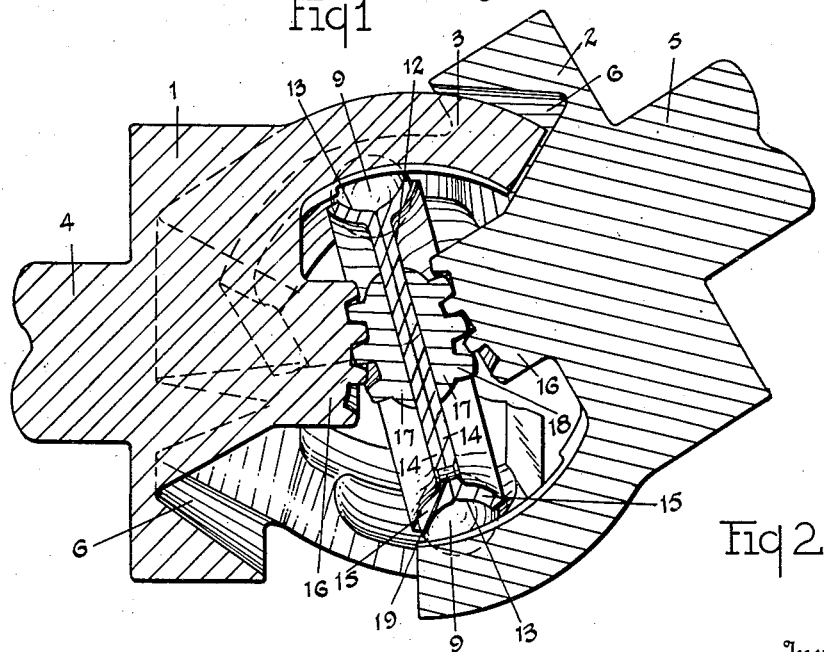
Figure 3:
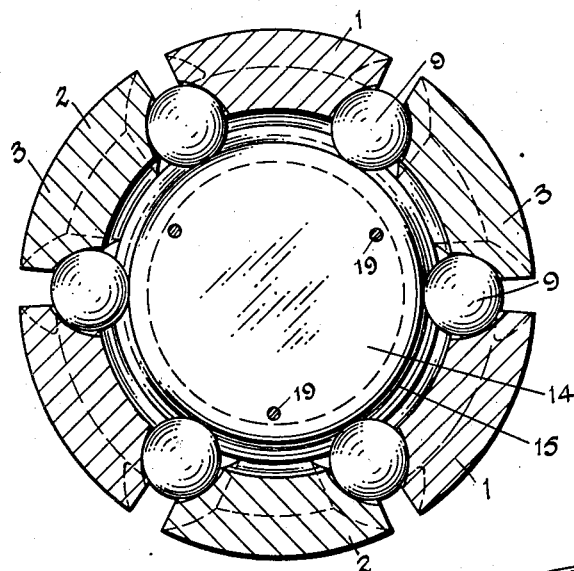
Figures 4, 5:
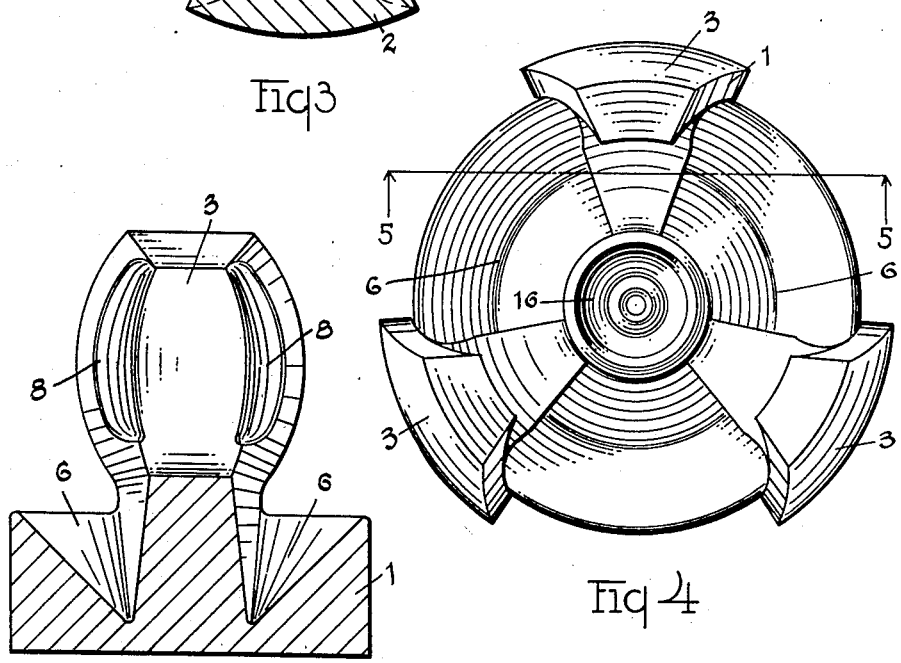

Fig. 1 is a side view of the joint. Fig. 2 is a view of a section taken on the plane of the line 2—2 indicated in Fig. 1. Fig. 3 is a view of a section taken on the plane of the line 3—3 indicated in Fig. 1. Fig. 4 is an end view of one of the rotative members. Fig. 5 is a view of a section taken on the plane of the line 5—5 indicated in Fig. 4.

In the joint, selected for purposes of illustration of a structure containing my invention, the members 1 and 2, that are interconnected by means of the joint, are provided with fingers 3. The fingers of each member are spaced apart distances, preferably, that are slightly greater than the width of the fingers, in order that the fingers may be interplaced and afford freedom of movement angularly. The fingers thus form, with the body of the parts 1 and 2, forked members, through which power is transmitted. The members 1 and 2 are rotatably supported by suitable bearing members. They form the connecting means between the parts 4 and 5 of the jointed shaft. The parts 1 and 2 have recesses 6 into which the fingers may enter as the members are angularly moved. Also, the fingers have spherical exterior surfaces, so that when they are placed together, they conform substantially to a sphere.

The fingers are provided with grooves 8 that extend along their side edges substantially as indicated. The grooves 8 are curved lengthwise to form the same curvature and, when the forked members are placed in power transmission relation, the grooves will be concentric in the center located in the axis of rotation of the member having the fingers. The grooves, furthermore, are curved transversely as distinct from longitudinally, and the bottom of the grooves lie in planes that extend through the axis of rotation of the member in which the grooves are formed. Steel balls 9 are located in the opposing grooves of the fingers 3.

The balls have a diameter sufficiently great that with the sloping lateral surface of the grooves, they will readily space the fingers to avoid looseness of play between the parts when held in the grooves. When the members are moved angularly, relative to each other, the balls will roll in the grooves, the grooves being so formed that freedom of movement of the balls is maintained. Thus the balls readily and automatically transmit the pressure, or torque, from one of the members to the other, that is, from the driving member to the driven member.

The balls are held in their power transmitting relation by means of a circular peripherally grooved body, such as, the disc shaped member 12 having the peripheral groove 13, in which the balls 9 are located. The groove 13 is, preferably, circular in a plane at right angles to the plane of the disc shaped member 12. The radius of the curvature on a plane extending at right angles to the lengthwise curvature of the grooves 8 and 13, is slightly less than the curvature of the circle described by the radius of the balls, whereby each ball is engaged at a single point by each of its coacting parts, namely, a finger on opposite sides of the ball and the disc shaped member that maintains the ball in position. Thus the friction, in movement, is limited quite entirely to a rolling friction as distinct from a sliding friction and, furthermore, the area of each contact is reduced to substantially a single point.

When the balls are in position they interlock the parts of the joint, by reason of the lengthwise curvature of the grooves 8 and the circular, or peripheral, groove 13. Any movement of either of the members 1 and 2, away from each other, is prevented by the surfaces of the grooves 8, the balls being maintained in a constant radius from the center of the joint by the disc-like member 12. Any longitudinal movement of one of the members, relative to the other, is thus resisted by the balls at their points of contact with the three grooves, in which each of the balls are located.

The member 12 is formed of a pair of plates 14 having a curved flange portion 15 that forms the groove 13 when the plates are secured together. They are secured together by rivets 19, that may be welded in position after the balls and plates have been placed in position within the fingers of the joint.

In order to maintain a constant angular velocity of one member relative to the other, notwithstanding the changes in the angular relation between the axes of the members, the contacting points, that is, the points through which the power is transmitted from one member to the other, must be maintained in a common plane and the plane must, at all times, be located in a position that will bisect the angle formed between the axes of rotation of the member. Thus the center of the joint must be maintained at a fixed point with reference to the parts of the joint or the axes of rotation must be intersected at a fixed point.

The fixed point is located in a plane extending through the center of the disc shaped member 12 and parallel to the faces of the disc member and, in order to maintain the plane in position to bi-sect the angle between the axes of rotation of the members, means is provided for positively holding the grooves body, that is, the disc shaped member 12, so that its surfaces will lie on opposite sides of and parallel to the central plane. This position is maintained by so shaping parts of the member 1, 2, and 12, that, as the members 1 and 2 are angularly moved, relative to each other, the parts will roll on each other to tilt the member 12 by the pressure of the parts on 1 and 2 towards each other and maintain the central plane of the member 12 at right angles to the direction of pressure of the said parts on 1 and 2. Thus the members 1 and 2 are provided with the parts 16 that are shaped to roll relative to the part 12, and maintain any given points on the axes of rotation of the members 1 and 2 at a fixed distance from the intersection of the said axes, that is, from the center of the joint. This may partake of the shape of an ellipsoid or of an oblate spheroid, to compensate for the thickness of the peripherally grooved body of the joint. Owing to the thickness of the disc-like member 12, the distance of the contact point of the parts 16, of the members 1 and 2, would be displaced at least the distance equal to the difference between one-half the thickness of the disc-like member 12 and the diagonal extending from the center of the disc-like member to the point of contact, if the said parts 16 were formed spherical and in contact with the sides of the disc. In order to overcome this difference, and to eliminate any displacement, which would reduce the efficiency of the joint, the controlling surfaces of the parts 16 are, preferably, oblate spheroidal.

The shape of the surfaces may be varied. The member 12 may be provided with parts that have surfaces that deviate from the plane surfaces of the member 12. The two sets of parts, one set located on the members 1 and 2, and the other set located on the member 12, may be thus formed to compensate, not only for the change in the location of the contacting point, but also for the characteristic surfaces that are given to the said parts, that is, the shape of the surfaces of one set of parts must compensate for the surfaces of the other set of parts in order that they may compensate for the change in position of the pressure line, that extends through the member 12 and at right angles to its central plane, away from the center of the member 12.

In the form of construction shown, the member 12 is provided with two hemi-oblate spheroidal parts 17, while the parts 16 have oblate spheroidal surfaces that contact with the oblate spheroidal surfaces of the parts 17. The parts 16 and 17, however, are, preferably, grooved to form intermeshing teeth, or ridges, 18, in order to maintain these parts in positive engagement with each other and insure that there will be produced a pressure line between corresponding portions of the parts 16 and 17. This pressure line, which is thus produced, will thus maintain the peripheral groove of the disc-like member 12, at all times, in the plane that bi-sects the axes of rotation of the members 1 and 2. It is true that when the ridges and grooves are formed in the parts 16 and 17, there is a departure from the ellipsoidal, or oblate spheroidal shape, yet the effective areas that are engaged, will lie in a surface that conforms to the surfaces of the oblate spheroid in the same manner that effective pressures of two gear wheels are transmitted substantially through the pitch line, or circles, on which is based the ratio of the gear wheels.

Thus I have provided a means for positively maintaining the parts 16 and 17, of the character described, in positive interengagement to maintain them in definite relation to each other and thereby insure a positive location of the plane of the centers of the balls such that it will bi-sect the angle between the axes of rotation of the members 1 and 2.

If desired, the parts 17 may be slidably located on the plane surfaces of the disc 12 to eliminate all binding that may otherwise occur where the parts 16 and 17 are formed to positively engage and interconnect each other as by the use of the ridges and channels, as described, and allow for wear of the parts of the joint. This will not only maintain the central plane of the disc-like member 12, at right angles to the pressure line extending through the parts 16 and 17 at the points at which they interengage, but will compensate for any deviation of the interengagement between the parts from the true oblate spheroidal surface or ellipsoidal surfaces that, in turn, compensate for the change in length that would otherwise occur by reason of the change in the angularity of the axes of the rotatable members to the plane surfaces of the member 12.

While in accordance with the provisions of the statutes, I have illustrated and described the best forms of my invention now known to me, those skilled in the art will readily understand that many changes may be made in the form of the device disclosed without departing from the spirit of my invention, as set forth in the appended claims, and that certain features of my invention may be used to advantage without a corresponding use of other features.

I claim:

1. In a forked universal joint for connecting two rotatable members, the fingers of the forked members having opposed concentric grooves, a circular body having a peripheral groove located in the plane extending transverse to the fingers of the forked members, balls located in the grooves for interconnecting the parts, the body and the members having rolling contacting parts whose surfaces operate to positively maintain given points on the axes of rotation of the members constant distances from the intersection of the axes of the members as the members are moved angularly relative to each other.

2. In a forked universal joint for connecting two rotatable members, the fingers of the forked members having opposed concentric grooves, a circular body having a peripheral groove located in the plane extending transverse to the fingers of the forked members, balls located in the grooves for interconnecting the parts, the body and members having thereon oblate spheroidal parts whose surfaces operate to maintain given points of the axes of rotation of the members a constant distance from the center of the joint.

3. In a forked universal joint for connecting two rotatable members, the fingers of the forked members having opposed concentric grooves, a circular body having a peripheral groove located in the plane extending transverse to the fingers of the forked members, balls located in the grooves for interconnecting the parts, the body and members having parts thereon whose surfaces operate to maintain given points of the axes of rotation of the members a constant distance from the intersection of the axes of rotation of the members as the members are moved angularly one relative to the other, the said parts having circular interengaging teeth for positively maintaining interengagement between the parts and maintaining the groove of the body in a plane that bi-sects the angle between the axes of rotation of the members.

In witness whereof I have hereunto signed my name to this specification.

HUBERT A. MYERS.